May 2, 1961 J. VICKERY 2,982,098
LIQUID FUEL VAPORIZING COMBUSTION SYSTEMS
Filed April 19, 1954 7 Sheets-Sheet 6

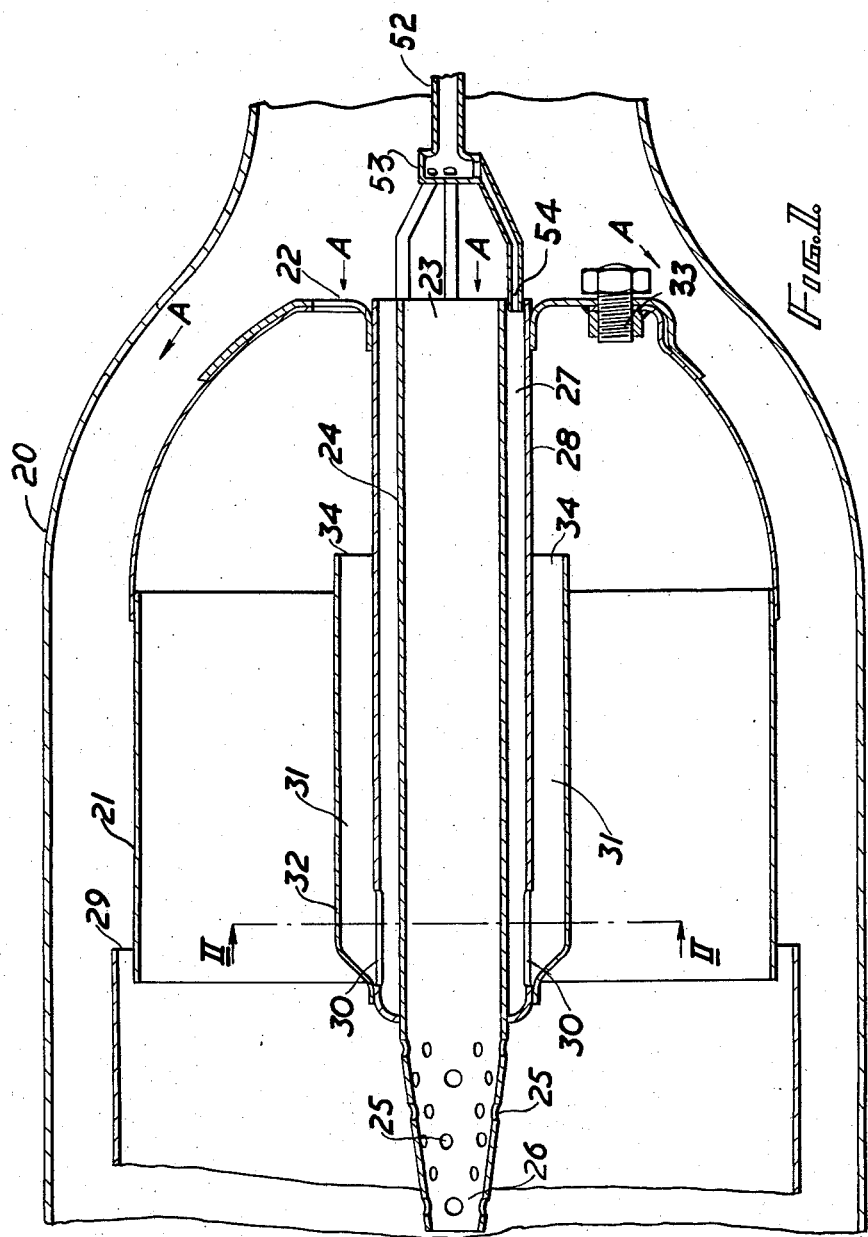

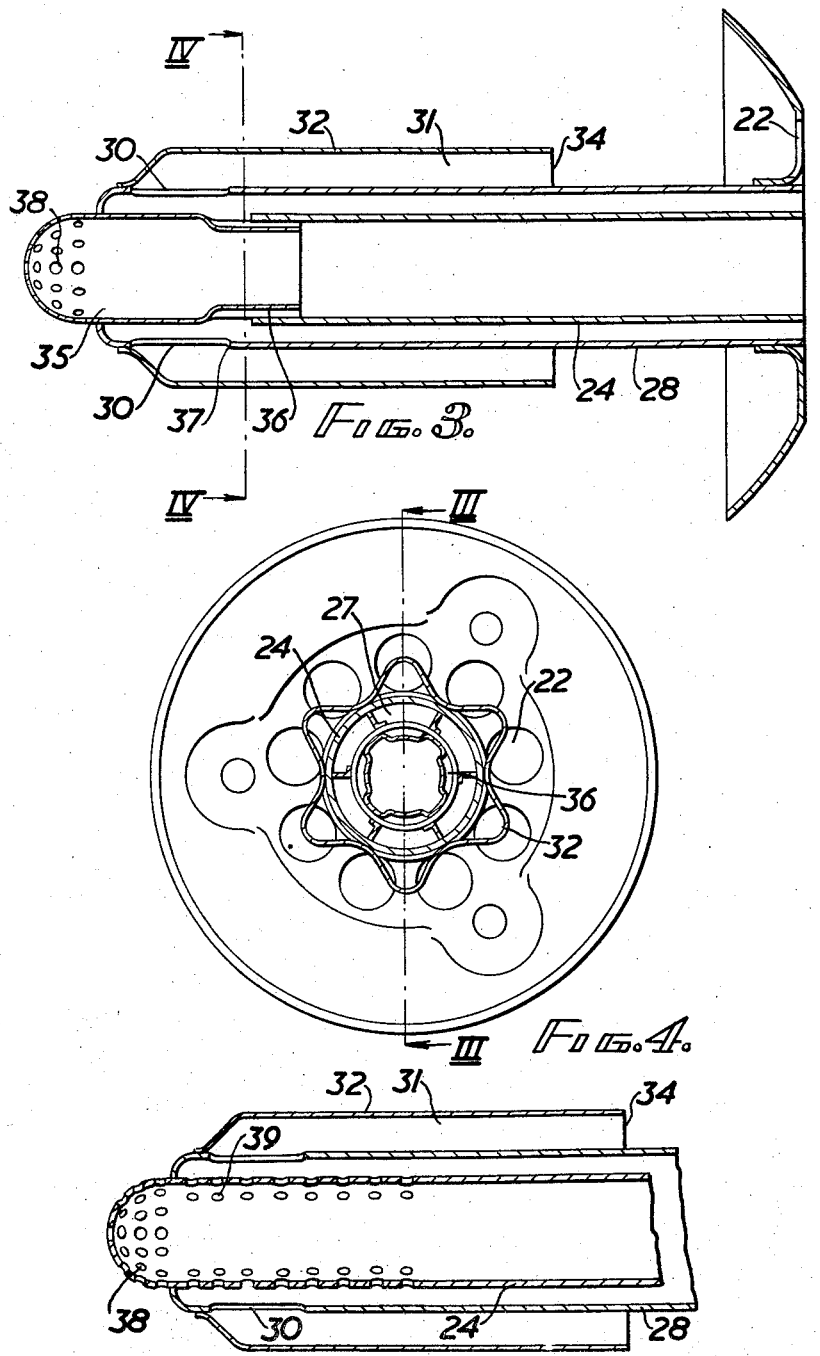

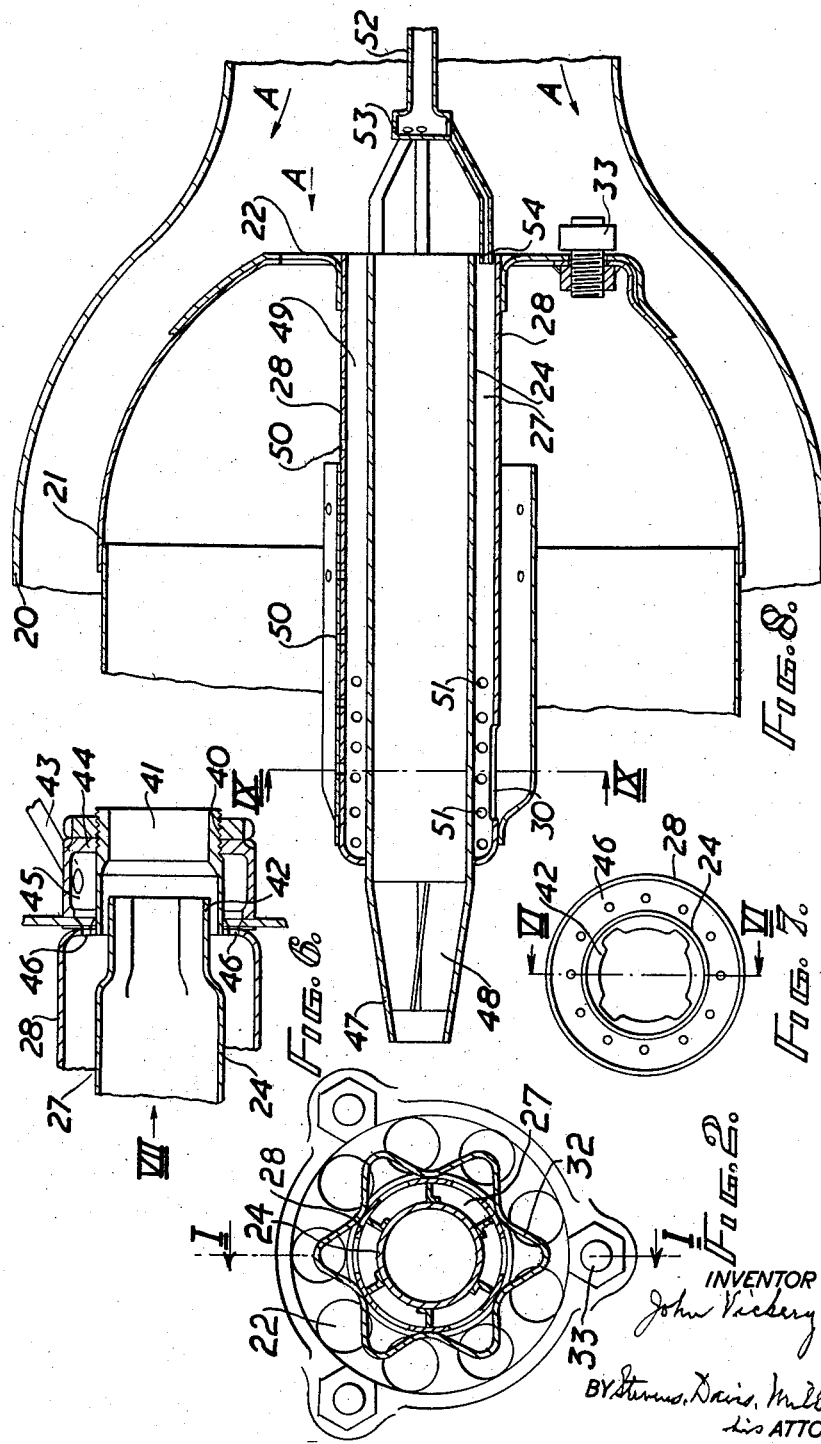

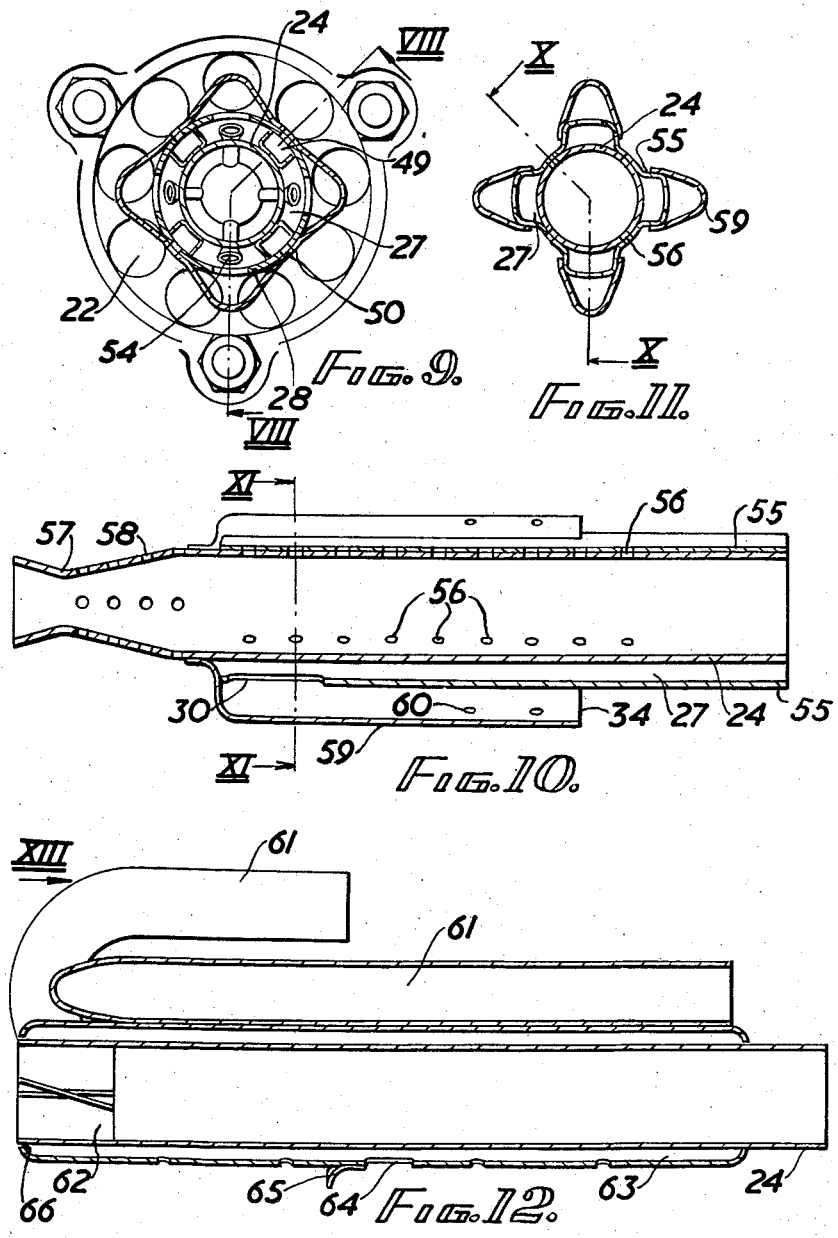

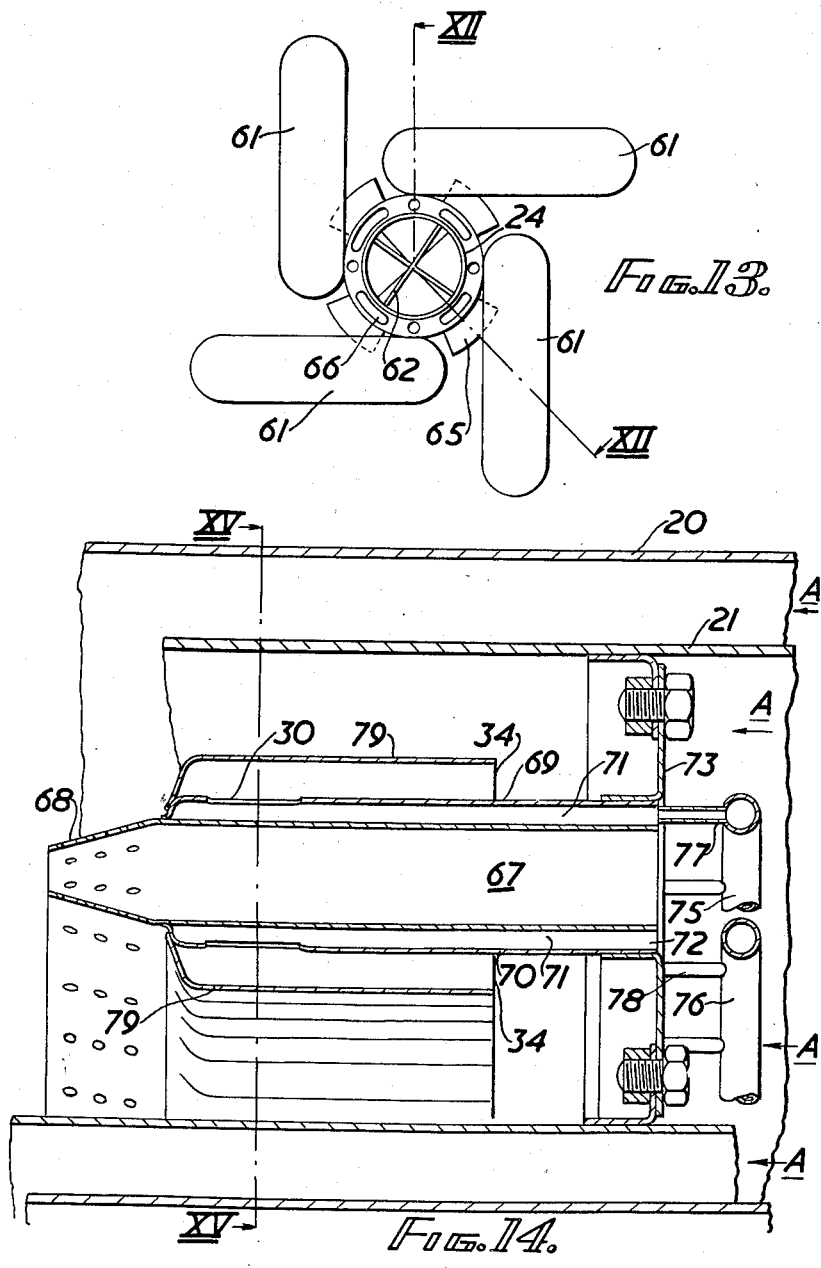

INVENTOR
John Vickery
BY Stevens Davis Miller & Mosher
his ATTORNEYS

May 2, 1961 J. VICKERY 2,982,098
LIQUID FUEL VAPORIZING COMBUSTION SYSTEMS
Filed April 19, 1954 7 Sheets-Sheet 7

INVENTOR
John Vickery
BY Stevens, Davis, Miller & Mosher
ATTORNEYS

United States Patent Office 2,982,098
Patented May 2, 1961

2,982,098

LIQUID FUEL VAPORIZING COMBUSTION SYSTEMS

John Vickery, Croydon, England, assignor to Power Jets (Research & Development) Limited, London, England, a British company Filed Apr. 19, 1954, Ser. No. 424,142

Claims priority, application Great Britain Apr. 22, 1953

7 Claims. (Cl. 60—39.71)

This invention relates to vaporizing combustion systems for liquid fuel and is particularly applicable to such systems proposed for embodiment in gas turbine plant.

Although liquid fuel vaporizing combustion systems are already in use in certain gas turbine plants, there is a number of problems that often arise in the development to effective operation of vaporizing systems. Some that may be mentioned are cracking of the fuel, uneven distribution of fuel, the occurrence of hot spots in the duct leading the fuel to the injection nozzle, vibration and noise. If an annular combustion chamber is required, it is not always easy to provide an even distribution of vaporized fuel in the vaporizing space.

Where there is a substantial excess of air over that required for combustion, as there normally is in gas turbine plant, then a proportion of the air supply is used for diluting the combustion gases from the primary combustion zone in the combustion chamber. The combustion gases must be thoroughly mixed with the diluting air and a difficulty sometimes arises in that there is a hot core of combustion products downstream of the primary combustion zone which hot core is not easily avoided.

The present invention provides a liquid fuel vaporizing combustion system comprising a combustion chamber, a flame tube within said chamber, means for vaporizing fuel by the heat of combustion and for introducing such vaporized fuel into a primary combustion zone within the upstream end of said flame tube, and a channel extending longitudinally from said upstream end for introducing coolant fluid into the core of combustion products downstream of said zone. Preferably the fuel vaporizing and introduction means surrounds the channel through which coolant fluid is introduced.

The combustion system as set forth is applicable where the combustion chamber and its flame tube are of generally cylindrical shape and where an annular combustion chamber is fitted with cylindrical flame tubes or with an annular flame tube.

The invention may also be considered as providing a liquid fuel vaporizing combustion system comprising a combustion chamber, a flame tube within said chamber, passages extending from the upstream end of the flame tube in heat exchange relationship with the primary combustion zone therein and terminating in apertures giving access to that zone, means for introducing fuel into said passages and a channel extending through both the upstream end of the flame tube and said primary combustion zone and being at least partly heat insulated by said passages from said zone to terminate in an outlet downstream of said zone.

The coolant introduced through the channel may be given a whirling motion as it is imparted into the flame tube. The channel may also be provided with tappings along its length by means of which combustion supporting air is introduced into the primary zone.

The invention will now be described with reference to certain embodiments thereof, given by way of example only and shown in the accompanying drawings in which:

Figure 1 is a sectional elevation of the upstream end of a combustion chamber forming an embodiment of the invention. It is a section on the line I—I of Figure 2 which is itself a part section on the line II—II of Figure 1.

Figures 3 and 4 are respectively a sectional elevation and a cross-section of the fuel and air introduction arrangements for the primary combustion zone of another embodiment of the invention. Figure 3 is a section on the line III—III of Figure 4, the latter being a section on IV—IV of Figure 3.

Figure 5 illustrates as a sectional elevation, an alternative construction for the embodiment shown in Figures 3 and 4.

Figures 6 and 7 will be used to indicate one method of introducing a fuel and air mixture into the vaporizer of the combustion system. Figure 6 is a sectional view on the line VI—VI of Figure 7 and the latter is an end view in the direction of arrow VII of Figure 6.

Figures 8 and 9 are a sectional elevation and a cross-section respectively of another embodiment of the invention in which combustion supporting air is introduced into the primary combustion zone from a central air inlet. Figure 8 is a section on the line VIII—VIII of Figure 9, and Figure 9 is a section on the line IX—IX of Figure 8.

Figures 10 and 11 show an alternative construction for the main part of the embodiment of Figures 8 and 9. Figure 10 is a sectional elevation on the line X—X of Figure 11 and Figure 11 is a cross-section on the line XI—XI of Figure 10.

Figures 12 and 13 show a method of incorporating J-pipe vaporizers in an embodiment of the present invention. Figure 12 is a section on the line XII—XII of Figure 13, the latter being a view in the direction of arrow XIII in Figure 12.

Figure 15:
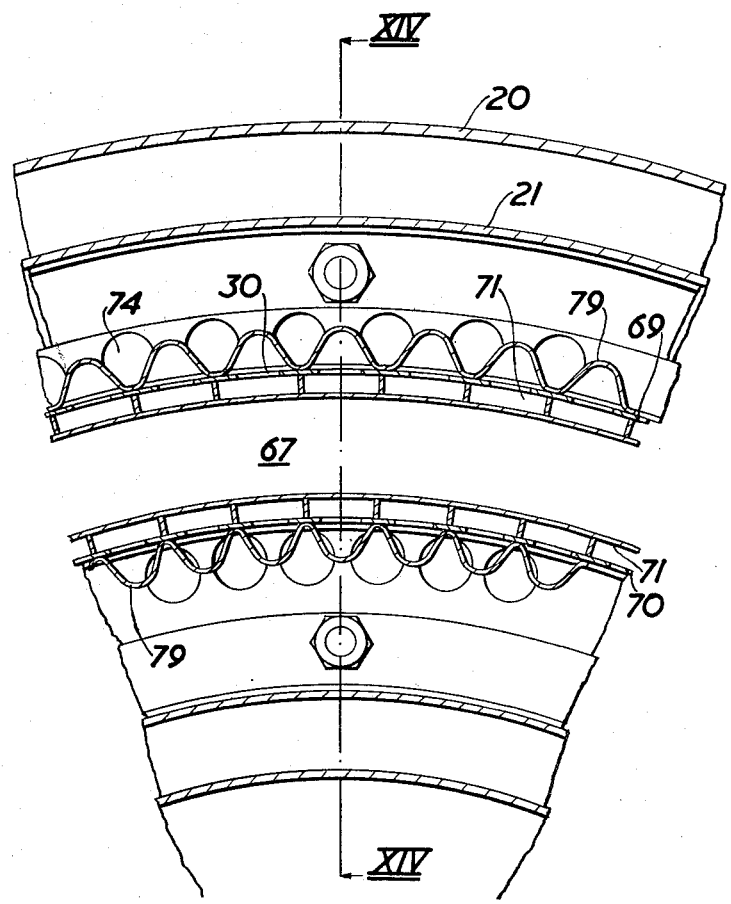
Figure 17:
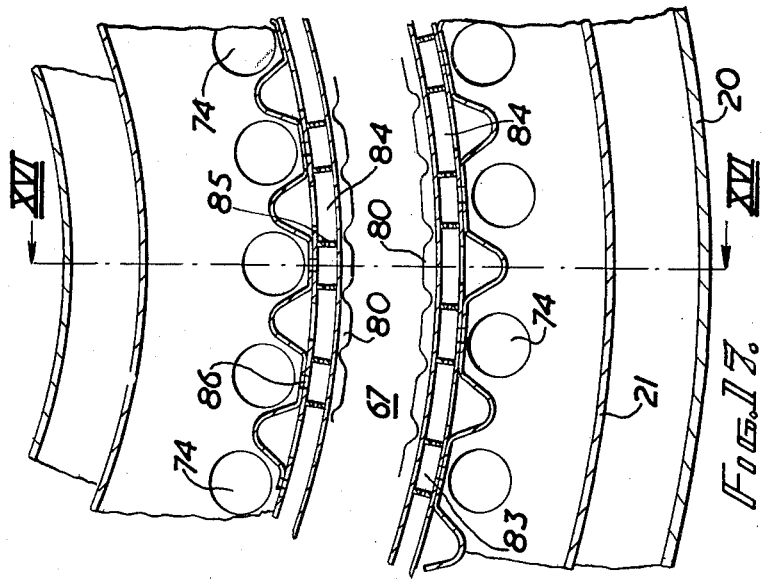
Figure 16:
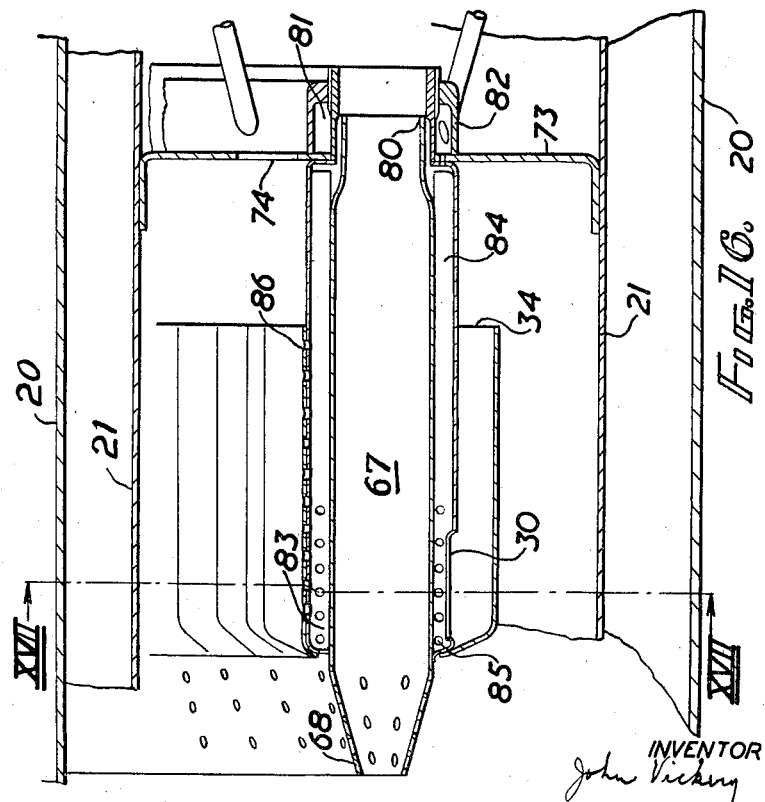

Figures 14–17 show annular combustion systems, Figures 14 and 15 illustrating one embodiment and Figures 16 and 17 another. Figures 14 and 15 are sections on the line XIV—XIV of Figure 15 and on the line XV—XV of Figure 14 respectively. Figures 16 and 17 are sections on the line XVI—XVI of Figure 17 and on the line XVII—XVII of Figure 16 respectively.

Throughout the drawings the same reference numerals are used for corresponding parts.

In Figures 1 and 2 there will be seen a combustion chamber 20 surrounding a generally cylindrical flame tube 21 the upstream end of which is indicated towards the right hand side of Figure 1. Air enters the combustion chamber in the direction of the arrows A and a major portion passes into the annular space between the combustion chamber outer wall 20 and the flame tube 21. Some, however, enters the upstream primary combustion zone of the flame tube through the air inlet holes 22. This primary air inlet may need to incorporate swirl vanes. Other air enters into a upstream metering inlet end 23 of the central channel 24 whence it flows longitudinally along the flame tube and is finally introduced, through perforations 25 and an outlet aperture 26, into the core of flame and combustion products at the downstream end of the primary combustion zone. A metering inlet is an inlet of predetermined size capable of passing a desired quantity of fluid under certain conditions. At the upstream end of an annulus 27 between the channel 24 and a tube 28 concentrically surrounding it, there is introduced both fuel and air. Fuel is supplied under pressure through a pipe 52 and through a distributor 53 and outlets 54. In a manner well understood in gas turbine combustion chambers, a major portion of the air supply by-passes the primary combustion zone and enters the flame tube downstream thereof. Some of this by-pass air is used to cool the flame tube. An annular entry for this cooling air is indicated at 29.

It will be seen from Figure 2 that the fuel and air mixture is introduced into the sector shaped passages of the annulus 27 and that this mixture has access through slots 30 into passages 31 formed by corrugations 32 in the sheet metal tube attached to the outside of the tube 28.

The central air channel 24 and the fuel and air passages which surround it are together supported from the upstream end of the flame tube by bolts 33. The flame tube itself is supported within the combustion chamber in conventional manner.

In operation, air at high velocity is supplied at the upstream end of the combustion chamber, the major portion is by-passed around the primary combustion zone in the flame tube to provide dilution air further downstream; the combustion supporting air is introduced through the air inlet holes 22. The fuel and air mixture is received into the primary combustion zone via outlets 34 from the passages 31 and the mixture is ignited and burns stably within this combustion zone. A conventional ignition means is provided but is not shown in the drawing. Liquid fuel is introduced into the annulus 27 under pressure and flows downstream picking up some heat from the combustion taking place about it in the flame tube as it passes in this direction. The corrugations 32 are fully exposed to the heat of combustion so that as the fuel and air mixture passes through the slots 30 and reverses its direction to pass upstream towards the outlets 34 the fuel is vaporized. Hence vaporized fuel and air emerge at the outlets 34.

For the particular purpose of reducing the tendency for hot spots to occur in the vaporizing system, the slots 30 are shaped to minimize the risk of small particles of fuel or carbon being trapped at the place of reversal of fuel flow. Even so, there is still danger that small quantities of matter might collect at the upstream edges of the slots 30 and, in order to prevent this, the arrangement of Figures 3 and 4 has been devised. The downstream end of the central air channel 24 is cut off short and a separate end piece 35 is inserted. This has a crimped upstream end 36 forming small passages which inject air directly from the central air channel towards the upstream edges 37 of the slots 30. By this means turbulence is caused at those upstream edges and stagnancy of the fuel is prevented. It will be noted that the downstream end of the central air channel now has a colander-like outlet 38. This is an alternative to the arrangement shown in Figure 1. In other respects the arrangement is similar to that already described and its operation is the same also.

In Figure 5 there is indicated an alternative to the arrangement of Figure 3 in that the central air channel 24 is in one piece, ending with the colander-like outlet 38. Also the passages, formed in the Figure 3 construction by the crimped inserted end of the end piece 35, are here formed by a number of small holes 39 suitably positioned in the wall of the channel 24.

One method of introducing fuel and air into the passages of the annulus 27 is indicated in Figures 6 and 7. The end of the channel 24 is crimped at circumferentially spaced stations and fitted within a short tube 40. Passages 42 are provided for air to flow from an inlet 41 not only into the central air channel but also into the passages of the annulus 27. Fuel is supplied via a pipe 43 to a banjo union 44 which annularly surrounds the tube 40. An annular chamber 45 is therefore supplied with fuel under pressure and this fuel gains access to the passages of the annulus 27 via injector apertures 46.

In Figures 8 to 11 there is indicated an embodiment of the invention in which a centrally introduced air supply is not provided only for mixture with the hot core of flame and combustion products at the downstream end of the primary combustion zone; there is also means for delivering from the central source, combustion-supporting air into the primary combustion zone. Again there is the central channel 24 through which air introduced from the upstream end of the combustion chamber is passed to the downstream end of the primary combustion zone. It emerges, in this example, through a convergent nozzle outlet 47, which is fitted with swirl vanes 48 designed to help in the mixing of the cooling air with the hot core. Concentrically surrounding the channel 24 there are not only the passages of the annulus 27 for the supply of fuel and air but also, dispersed with such passages, further air supply passages 49 open at their upstream end. These air passages 49 have outlet holes 50 through which combustion supporting air is introduced radially into the primary combustion zone. The fuel vaporizing arrangement is constructed as already generally indicated in previous figures, but the provision of the air passages 49 is also made use of by the drilling of small holes 51 between the passages 49 and 27 in the region of the slots 30. Air so introduced into the passages 27 prevents stagnation of fuel where it changes its direction of flow. The opportunity has been taken in this figure to indicate another method of fuel introduction. Fuel is supplied under pressure through the pipe 52 and through the distributor 53 to outlets 54. The latter are positioned in the upstream end of the fuel and air mixture passages 27.

Instead of having separate air and fuel and air passages centrally mounted in the flame tube it is possible simply to make use of the one central air channel both to provide air to the downstream end of the primary combustion zone and air for supporting combustion in that zone. Such an arrangement is shown in Figures 10 and 11. The central air channel 24 has mounted upon it a corrugated tube 55 which forms in part the fuel and air mixture flow passages 27 in the manner indicated in Figure 11. The corrugated tube 55 fits tightly to the central channel 24 peripherally between the passages 27. In those peripheral troughs formed by the corrugated tube, holds 56 are drilled along the major part of the length of the central channel 24 and, by means of these holes, air is introduced into the primary combustion zone. Air passing through the central channel and not escaping into the primary combustion zone in this way passes to the downstream end of that zone as in previous embodiments. In Figure 10, the outlet end 57 of the central channel is shown as a convergent divergent nozzle having some holes 58 in its periphery. The sheet metal corrugated passages through which the fuel and air mixture finally escapes through the outlets 34 into the primary combustion zone extend radially outwards from the corrugations in the tube 55. They are formed by channel sections 59, as is clearly seen in Figure 11. If it is desired, some vaporized fuel and air may escape into the primary combustion zone not only through the outlets 34 but also through some small holes 60 provided for that purpose.

In Figures 12 and 13 a construction of combustion chamber having conventional J-tube vaporizers has been illustrated. Four J-tubes are shown at 61 and these are disposed symmetrically about the central air channel 24. As in previous examples, air passes downstream through this channel to the downstream end of the primary combustion zone and, in this case, it can escape into that region through a plain outlet fitted with swirl vanes 62. An annular air channel 63 is arranged around the central air channel 24 and this can be used to provide centrally admitted combustion supporting air for instance through slots 64 adjacent scoops 65. Small holes may also be drilled in this air annulus wall in order to direct small cooling streams of air on to the parts of the vaporizing J-tubes which are prone to become hot spots. Air in this annulus not used for combustion or for cooling in this way is ejected through holes 66 in the downstream end. It will of course be understood, by those skilled in the art, that fuel and air are both directed into the upstream end of the J-tubes in conventional manner.

In Figures 14 to 17 there have been illustrated embodiments of the invention in which the principles thereof have been applied to annular combustion chambers. One embodiment is shown in Figures 14 and 15, in which the combustion chamber and flame tube walls 20 and 21 have been referenced as before in spite of the fact that they are annular. The air introduction now from the upstream end of the flame tube into the downstream end of the primary combustion zone is through an annular channel 67 which has a perforated downstream outlet end 68. On both outer surfaces of the channel 67 there are provided passages 71 for the downstream flow of fuel and air by means of annular sheets 69 and 70 respectively. The passages 71 so provided are open at their upstream ends as shown at 72 in Figure 14. The air channels 67 and the sheets 69 and 70 are supported by a plate 73. This plate 73 is fitted into the upstream end of the flame tube. Fuel is supplied under pressure to pipes 75 and 76 which give access through connections 77 and 78 to the outer and inner passages 71 respectively. Air is also admitted into these passages and the two flow together in a downstream direction until they reach the slots 30 through which they pass into vaporizing corrugations 79, eventually emerging into the primary combustion zone at the upstream end of the annular combustion space through the outlets 34.

Figures 16 and 17 show another application of the general principle already described above in relation to a cylindrical flame tube and now applied to an annular flame tube and combustion system. In this instance, the annular air channel 67 has its upstream end crimped as shown at 80 in order to provide a construction similar to that already described in relation to Figures 6 and 7. As it is an annular construction fuel is supplied through what may be termed annular banjos 81 and 82. In other respects this embodiment may be considered as having features comparable with features shown in Figures 8 and 11 in that firstly there are air passages 83 in addition to the fuel and air passages 84, in that small holes 85 are provided for the introduction of air adjacent the slot 30 and in that combustion supporting air is introduced through holes 86 into the primary combustion zone.

In all the embodiments described above means are shown for providing a predetermined quantity of cooling air in the downstream region of the primary combustion zone in order to remove any hot core in the flame and combustion products that might otherwise there be present. It will be apparent that the air channel need not necessarily be cylindrical but that arrangements may be made to provide suitable velocities and pressures. This cooling air is capable of providing very good mixing so that the overall length of the combustion chamber may be reduced. The constructions shown enable fuel and air to be introduced into the vaporizing means with reduced tendency to the development of hot spots or to fuel cracking. The vaporizing means is soundly constructed and there should be a reduced tendency to vibration compared with some types of vaporizers previously proposed. The various constructions are simple to manufacture and have the advantage that they can be easily dismantled. In the annular combustion system, the vaporizing annulus is preferably divided into a number of sectors which are separately mounted on the plate 73.

What I claim is:

1. A liquid fuel vaporizing combustion system comprising a combustion chamber, a flame tube of generally cylindrical form open at its downstream end, primary air inlet means at the upstream end of said flame tube and a combined vaporizer and air introducing means situated centrally of the flame tube and extending into the flame tube axially from the upstream end and through a primary combustion zone thereof but terminating upstream of the downstream end thereof, the latter means comprising a central air channel open at its upstream end and open at its downstream end to the core of the combustion products and vaporizer passages surrounding said channel between said channel and said combustion zone providing fuel flow paths into said flame tube and shielding said channel from said combustion zone.

2. A liquid-fuel vaporizing combustion system including a combustion chamber, a flame tube within the combustion chamber, a primary combustion zone defined at least in part by the flame tube, passages extending through an upstream end of the flame tube and in heat exchange relationship with the primary combustion zone, apertures terminating the passages and giving access to the combustion zone, means to introduce fuel into the passages and a channel passing through the upstream end of the flame tube and extending through the primary combustion zone to terminate in an outlet into the flame tube positioned substantially centrally within the flame tube and within a hot core of combustion products downstream of the primary combustion zone, said passages being positioned to surround said channel between said primary combustion zone and said channel to shield said channel from said primary combustion zone.

3. A liquid fuel vaporizing combustion system comprising a combustion chamber, a flame tube within said chamber, a primary combustion zone defined at least in part by the flame tube, passages extending through the upstream end of the flame tube in heat exchange relationship with the primary combustion zone therein, each of said passages having a portion to provide a flow path in a downstream direction relative to the general flow through the system and thereafter to provide a flow path in a relatively upstream direction, apertures terminating said passages and giving access to said zone, means for introducing fuel into said passages, a channel extending through both said upstream end of the flame tube and said primary combustion zone, and an outlet terminating said channel disposed centrally with respect to the flame tube and arranged downstream of said zone to open into the core of the combustion products.

4. A combustion system as claimed in claim 3 in which said passages and said channel are constructed as a unit, the passages being disposed at spaced intervals about said channel.

5. A combustion system as claimed in claim 3 in which said channel has apertures along its length to provide communication between the channel interior and said primary combustion zone.

6. A combustion system as claimed in claim 3 in which said channel outlet comprises a perforated end piece.

7. A combustion system as claimed in claim 3 in which communication is provided between said channel and said passages at the region of the reversal of flow in said passages.

References Cited in the file of this patent

UNITED STATES PATENTS

| | | |
|---|---|---|
| 2,541,900 | Williams | Feb. 13, 1951 |
| 2,593,849 | Clarke et al. | Apr. 22, 1952 |
| 2,622,396 | Clarke et al. | Dec. 23, 1952 |
| 2,635,426 | Meshino | Apr. 21, 1953 |
| 2,646,664 | Meschino | July 28, 1953 |
| 2,664,703 | Whitelaw | Jan. 5, 1954 |
| 2,727,358 | Howes | Dec. 20, 1955 |
| 2,828,609 | Ogilvie | Apr. 1, 1958 |

FOREIGN PATENTS

| | | |
|---|---|---|
| 857,780 | France | Apr. 26, 1940 |
| 670,092 | Great Britain | Apr. 16, 1952 |